United States Patent [19]

Sakata

[11] Patent Number: 4,569,494

[45] Date of Patent: Feb. 11, 1986

[54] PITCH CONTROL OF SWEPT WING AIRCRAFT

[75] Inventor: Sumio T. Sakata, Seattle, Wash.

[73] Assignee: The Boeing Company, Seattle, Wash.

[21] Appl. No.: 452,815

[22] Filed: Dec. 23, 1982

[51] Int. Cl.$^4$ ............................................. B64C 23/06
[52] U.S. Cl. ................................. 244/199; 244/45 A; 244/75 R
[58] Field of Search ............... 244/15, 13, 75 R, 35 R, 244/199, 198, 45 R, 45 A, 130

[56] References Cited

U.S. PATENT DOCUMENTS

| | | | |
|---|---|---|---|
| 2,343,655 | 3/1944 | Flader et al. | 244/130 |
| 2,403,770 | 7/1946 | Van Zelm | 244/90 |
| 2,573,834 | 11/1951 | Davidson | 244/53 |
| 2,650,752 | 9/1953 | Hoadley | 244/120 |
| 2,694,357 | 11/1954 | Lee | 98/1 |
| 2,769,602 | 11/1956 | Furlong | 244/40 |
| 2,924,400 | 2/1960 | Ruget | 244/46 |
| 2,927,749 | 3/1960 | Brownell | 244/45 |
| 2,941,752 | 6/1960 | Gluhareff | 244/46 |
| 2,944,764 | 7/1960 | Lane et al. | 244/15 |
| 2,953,322 | 9/1960 | Lewis | 244/46 |
| 2,997,260 | 8/1961 | Locke, Jr. | 244/199 |
| 3,008,291 | 11/1961 | Hardgrave, Jr. | 60/35.6 |
| 3,082,981 | 3/1963 | Gruen | 244/130 |
| 3,093,348 | 6/1963 | Schelp et al. | 244/15 |
| 3,152,775 | 10/1964 | Boyd | 244/13 |
| 3,188,022 | 6/1965 | Ornberg | 244/45 |
| 3,218,005 | 11/1965 | Alvarez Calderon | 244/43 |
| 3,270,989 | 9/1966 | Polhamus et al. | 244/46 |
| 3,370,810 | 2/1968 | Shevell et al. | 244/41 |
| 3,384,326 | 5/1968 | Neubeck | 244/13 |
| 3,471,107 | 10/1969 | Ornberg | 244/199 |
| 3,525,486 | 8/1970 | Wimpenny | 244/42 |
| 3,539,133 | 11/1970 | Robertson | 244/42 |
| 3,578,264 | 5/1971 | Kuethe | 244/41 |
| 3,620,484 | 11/1971 | Schoppe et al. | 244/1 N |
| 3,642,234 | 2/1972 | Kamber et al. | 244/45 |
| 3,643,901 | 2/1972 | Patapis | 244/130 |
| 3,680,816 | 8/1972 | Mello | 244/46 |
| 3,693,913 | 9/1972 | Barland et al. | 244/130 |
| 3,739,458 | 5/1973 | Haberkorn | 244/47 |
| 3,744,745 | 7/1973 | Kerker et al. | 244/41 |
| 3,774,867 | 11/1973 | Quinn | 244/130 |
| 3,862,468 | 1/1975 | Fortune | 15/341 |
| 3,883,094 | 5/1975 | Mederer | 244/45 A |
| 3,926,389 | 12/1975 | Mederer | 244/45 A |
| 3,997,132 | 12/1976 | Erwin | 244/199 |
| 4,039,162 | 8/1977 | Calhoun et al. | 244/213 |
| 4,161,300 | 7/1979 | Schwaerzler et al. | 244/45 |
| 4,174,083 | 11/1979 | Mohn | 244/53 |
| 4,176,813 | 12/1979 | Headley et al. | 244/130 |
| 4,378,922 | 4/1983 | Pierce | 244/199 |

FOREIGN PATENT DOCUMENTS

| | | |
|---|---|---|
| 595877 | 4/1960 | Canada . |
| 1809593 | 9/1970 | Fed. Rep. of Germany . |
| 403182 | 4/1943 | France . |
| 1036691 | 9/1953 | France . |
| 664288 | 1/1952 | United Kingdom . |

OTHER PUBLICATIONS

FSW, *Horizons*, vol. 16, No. 1, 1980, (back inside cover).
Pp. 31–35 of Jun. 1980 issue of AERO.
P. 18 of Dec. 1980 issue of Flying.
P. 119 of AOPA PILOT.

*Primary Examiner*—Galen L. Barefoot
*Attorney, Agent, or Firm*—Bruce A. Kaser; Delbert J. Barnard

[57] ABSTRACT

A pair of vanes (26, 28) extend laterally outwardly from the fuselage (10) of a swept wing aircraft immediately forwardly of the wings (12, 14). The preferred vanes (26, 28) have a trapezoidal plan form, an outwardly tapering thickness and an airfoil cross-sectional configuration. The vanes (26, 28) are substantially aligned with streamlines (46) during level flight. In a maneuver the vanes generate vortices which flow rearwardly over the upper surfaces of the inboard portions of the wings (12, 14), causing the inboard portions of the wings (12, 14) to stall at lower angles of attack than that of the wings (12, 14) alone would otherwise dictate and a raising of the downwash of the wings in the region of the tail. This lifting of the downwash results in the horizontal stabilizers (16, 18) of the tail being effective to create moments in opposition to "pitchup" of the aircraft.

17 Claims, 8 Drawing Figures

PITCH CONTROL OF SWEPT WING AIRCRAFT

DESCRIPTION

1. Technical Field

The present invention relates to a method and apparatus for improving the longitudinal stability of a swept wing aircraft. More particularly, it relates to the provision of a method and apparatus for enhancing the effectiveness of the horizontal portions of the tail to oppose pitchup during maneuvers.

2. Background of the Invention

It is difficult to obtain satisfactory stall characteristics in a swept-back wing by wing surface design alone. Immediately following stall, the nose of an aircraft should inherently drop. During maneuvers, the outboard portions of swept-back wings tend to stall prior to the inboard portions. This can result in the nose of the aircraft rising rather than falling; a phenomenon termed "pitchup".

Present methods of combating early stall of the outboard portions of the wings are discussed in U.S. Pat. No. 3,370,810, granted Feb. 27, 1968 to Richard S. Shelvell, Roger D. Schaufele and Robert L. Roensch. The stall problems of swept-back wing aircraft are also discussed in U.S. Pat. No. 3,744,745, granted July 10, 1973, to Richard Kerker and Otis D. Wells. The disclosures of these patents speak for themselves and therefore the patents will not be discussed herein in any detail.

The present invention relates to the use of vanes on the body of a swept wing aircraft forwardly of the wings to modify the stall characteristics of the wings. As will be described, the vanes function to cause the inboard portions of the wings to stall earlier than when the vanes are not present.

Others have proposed the use of body vanes positioned forwardly of and/or above the wings of different type aircraft but for different purposes. Such a vane is disclosed in the June, 1980 issue of AERO, on pages 31-35. This vane, which will herein be referred to as the Robertson vane, is also mentioned on page 18 of the December, 1980 issue of "Flying" and on page 119 of AOPA PILOT.

The Robertson vane is not employed on a swept wing aircraft which cruises at speeds closely approaching Mach One. Rather, it is used on small straight wing aircraft of the type made by Cessna (Trademark), Piper (Trademark) and Beechcraft (Trademark), for example. The Robertson vane is a flat plate. One is mounted on each side of the fuselage, forwardly of the wing. In the articles it is stated that at large angles of attack, air from beneath the nose portion of a small aircraft will curl up around the bottom of the fuselage and angle upward towards the wing roots. It is stated that this can cause the inboard angle of attack to exceed that located farther outboard along the wing. The Robertson flow control vane simply deflects the airflow more horizontally to reduce the angle of attack at the wing root by about five or six degrees. Thus, the Robertson vanes are used to straighten out turbulent air to prevent early or premature stall of the inboard portions of the wings.

The use of body vanes positioned above the root portions of the wings of a straight wing aircraft is disclosed in Italian Pat. No. 403,182, granted on Apr. 8, 1943 to Gianni Caproni, Antonio Longo and Gian Domenico Mattioli. This patent discloses the positioning of one or more vanes or fins on the fuselage of the aircraft, in the dihedral region above the forward root portions of the wings. The vanes are rotatable and are used to eliminate the aerodynamic hysteresis in the dihedral region. The vanes cause stall in the dihedral at the zero lift angle or else just before or after this angle.

British Pat. No. 664,228, granted Jan. 2, 1952, to Robert T. Youngman, discloses positioning vanes on the sides of an aircraft forwardly of the root portions of the wings. Such vanes are designed to be flow-diverters and they are provided to reduce airflow disturbances caused by protuberances. The patentees state that the deflectors may take any form which will serve to break up turbulence and divert the airflow towards its natural path.

The potential "pitchup" problem associated with swept-back wings is attributable to the fact that the outboard portions of the swept-back wings tend to stall before the inboard portions of the wings. The horizontal stabilizer portions of the tail are supposed to produce moments tending to drop the nose of the aircraft. The airflow to the horizontal stabilizers is influenced by the presence of the wings forwardly of the stabilizers. The wings bend the flow downwardly. The flow behind the wing is termed the wing "downwash". The angle of the downwash is proportional to the amount of lift generated by the wing. When the outboard portions of the wings stall while the inboard portions of the wings are still functioning and producing lift, the downwash change from the wings reduces the horizontal stabilizer effectiveness, thus contributing an airplane nose up moment, i.e. a tendency to pitchup. The approach of the present invention is to primarily reduce the downwash by causing the inboard portions of the wings to stall at an angle of attack that is smalller than the angle of attack which would produce the pitchup problem if the present invention was not being utilized.

DISCLOSURE OF THE INVENTION

According to the present invention, at least one pitch control vane means is provided on each side of the fuselage of a swept wing aircraft. The vane means project laterally outwardly from the fuselage in positions relative to the wings such that in response to an increase in the angle of attack of the aircraft beyond a predetermined angle of attack the vane means will cooperate with the wings and horizontal stabilizer portions of the tail to oppose excessive pitchup of the aircraft.

The vane means are substantially aligned with streamlines during level flight, so that during level flight the vane means produces substantially no lift and minimal drag. As the angle of attack of the aircraft increases during a maneuver, there is a progressive increase in the angle of attack of the vane means. The configuration of the vane means is such that at a predetermined angle of attack, less than the angle of attack at which the inboard portions of the wings will normally stall, the vane means becomes active and generate vortices which flow rearwardly over the upper surfaces of the inboard portions of the wings. The vortices cause the inboard portion of the wings to stall at a smaller angle of attack when the design of the wings would dictate. This results in an elevation of the downwash field at the tail in a manner such that the horizontal stabilizers function to oppose pitchup of the aircraft.

In preferred form, each vane means is a single vane member having a swept-back leading edge, a forwardly angled read edge, and an airfoil cross section. Preferably also, the vane member tapers in thickness as it extends outwardly from the fuselage.

BRIEF DESCRIPTION OF THE DRAWINGS

In the drawings, like element designations refer to like parts throughout, and

BEST MODE FOR CARRYING OUT THE INVENTION

Figure 1:
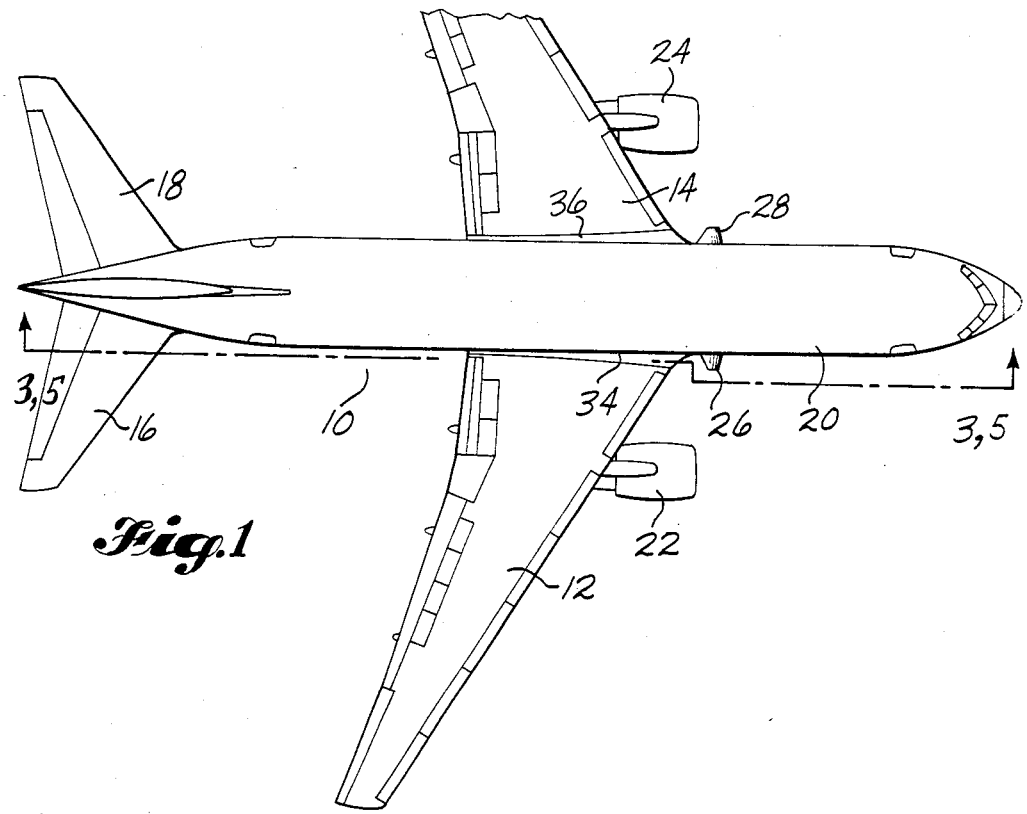
FIG. 1 is a top plan view of a swept wing aircraft, with a portion of one wing cut away; showing the fore and aft positioning of an embodiment of the pitch control vanes of the present invention.

Referring initially to FIG. 1, shown in top plan view is an aircraft 10 having swept-back wings 12, 14 and a tail section of a type having horizontal stabilizers 16, 18 which extend outwardly from the tail portion of the aircraft's fuselage 20.

The particular aircraft 10 that is illustrated has a pair of engines 22, 24 which are mounted at the lower ends of streamlined struts which depend from the wings 12, 14. In accordance with the present invention, the aircraft 10 is equipped with pitch control vanes 26, 28 which are connected to side portions of the fuselage 20 immediately forwardly of the wings 12, 14. In preferred form, the vanes 26, 28 are positioned vertically between the upper and lower surfaces 30, 32 of the wings 12, 14.

Figure 2:
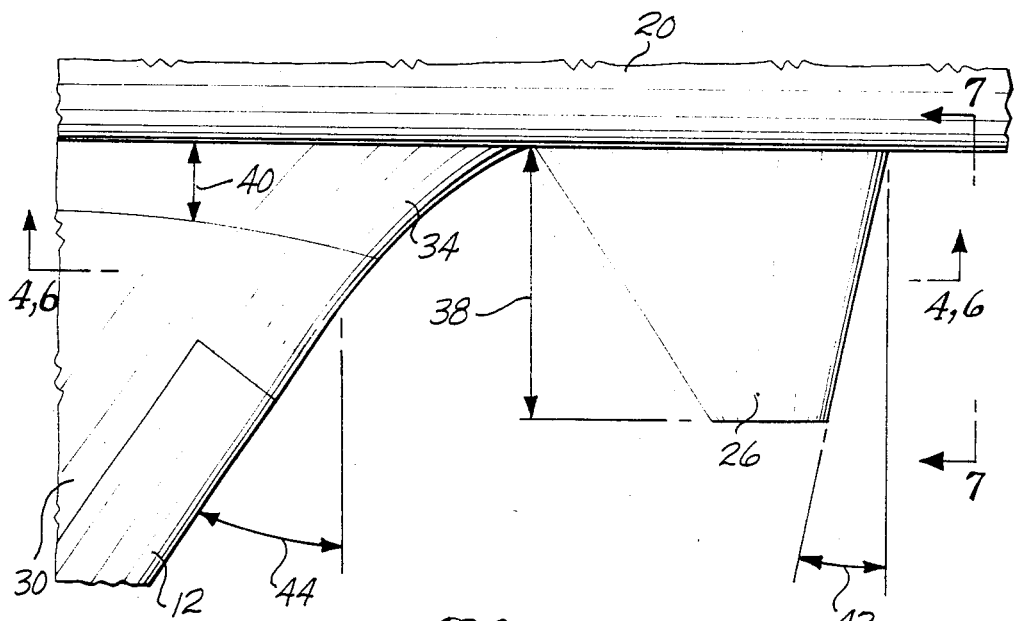
FIG. 2 is an enlarged scale, fragmentary, top plan view of the aircraft shown by FIG. 1 in the vicinity of the starboard vane and the leading edge portion of the starboard wing and its fairing.
Figure 3:
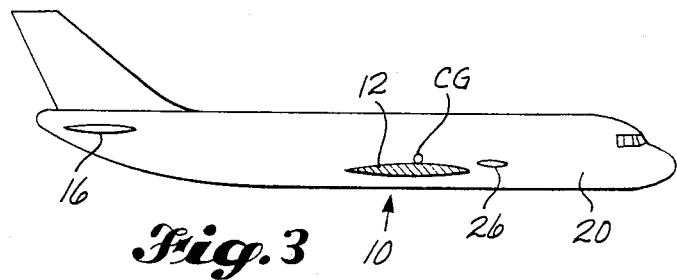
FIG. 3 is a reduced scale longitudinal sectional view taken substantially along line 3—3 of FIG. 1.
Figure 7:
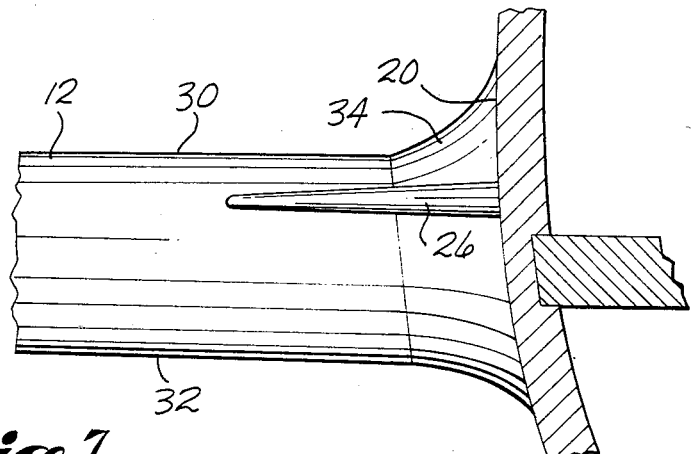
FIG. 7 is a fragmentary cross-sectional view taken substantially along line 7—7 of FIG. 2, presenting a front elevational view of the starboard vane and the root portion of the starboard wing and its fairing.

The pitch control vanes 26, 28 are positioned immediately forwardly of the inboard or root portions of the wings 12, 14. Fairings 34, 36, are provided between the wing roots and the fuselage 20. As shown by FIGS. 2 and 7, the span length 38 of the pitch control vanes 26, 28 exceeds the fairing width 40 a substantial amount.

By way of typical, and therefore nonlimitive example, an embodiment of pitch control vane is illustrated which has a span length of about thirty inches for an aircraft which has a total wing span of about 156 feet. These vanes 26, 28 have a maximum chord length at their roots of about thirty-nine inches and a minimum chord length at their tips of about nineteen and six tenths inches. As shown by FIG. 7, vanes 26, 28 are relatively thick at their roots and they taper gradually as they extend outwardly to their tips. The illustrated embodiment has a trapezoidal plan form. Its leading edge is swept back at a relatively shallow angle (e.g. 15°). Its trailing edge angles forwardly a greater amount (e.g. 36°). The particular aircraft 10 that is illustrated has a wing sweep angle 44 of about 35°.

Figure 4:
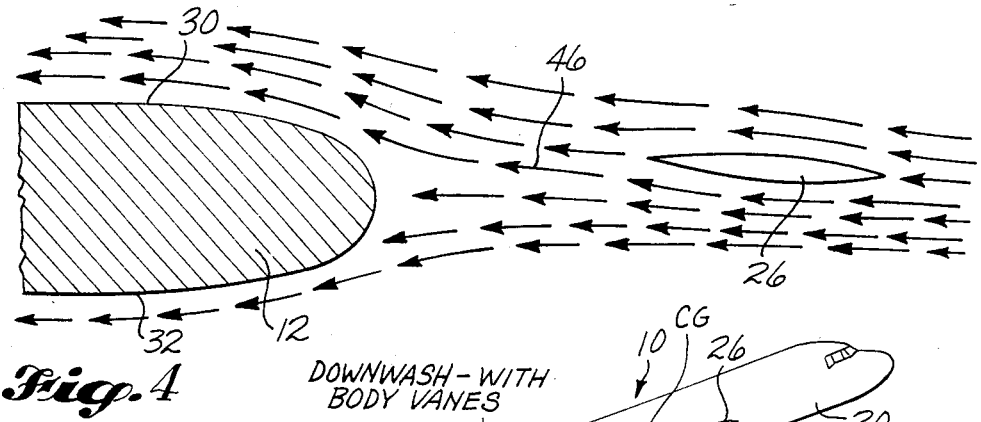
FIG. 4 is an enlarged scale sectional view of the starboard vane and the leading portion of the starboard wing during level flight, taken substantially along line 4,6—4,6, such view including streamlines and showing that during level flight the pitch control vanes are substantially aligned with the streamlines.
Figure 5:
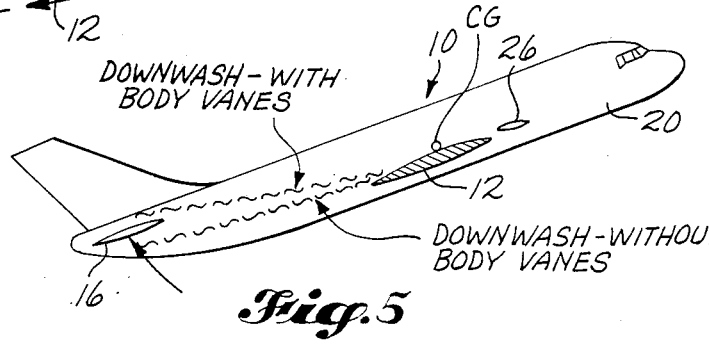
FIG. 5 is a view like FIG. 3, but showing the aircraft at high angle of attack, and showing the effect of the pitch control vanes on the wing downwash pattern.
Figure 6:
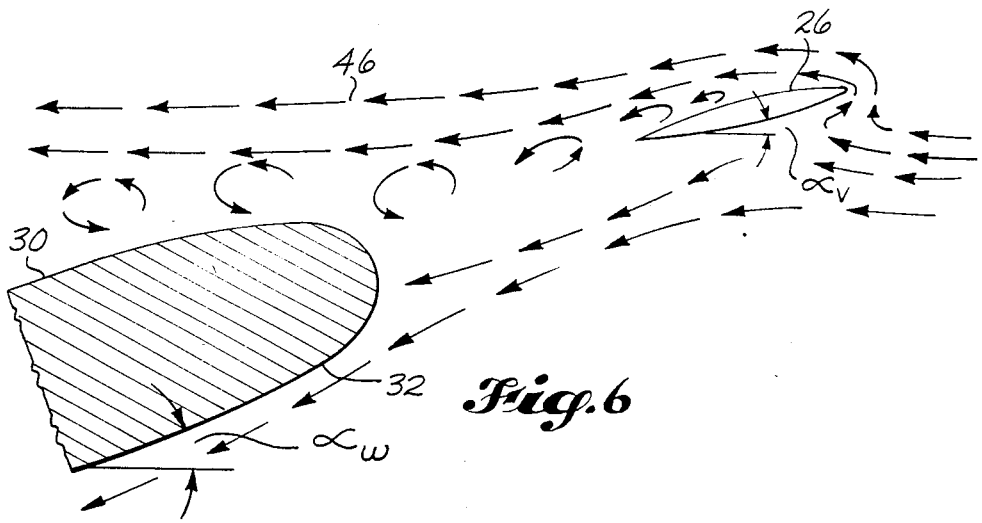
FIG. 6 is a view like FIG. 4, but showing the aircraft at high angle of attack, and showing a separation of flow from the upper surface of the vane.

As best shown by FIG. 4, the pitch control vanes 26, 28 are substantially aligned with the streamlines 46 when the aircraft is flying level. As a result of such alignment, and further because they are small, the vanes 26, 28 produce no lift and minimal drag.

Let it be assumed that the aircraft 10 is flying level and then makes a maneuver in which there is a progressive increase in the angle of attack of the wings. While flying level the vanes 26, 28 are aligned with the streamlines and generate essentially no lift and experience very little drag. While in the maneuver they generate lift. Eventually when the angle of attack of the vanes 26, 28 becomes large enough flow separation of the vanes 26, 28 occurs and random vortices flow rearwardly over the root portions of the wings. The vortices modify the flow pattern over the inboard portions of the wings in a manner reducing the lift capabilities of the wings in these regions. Investigations conducted with respect to the illustrated embodiment indicated that there is a reduction in wing lift within the inboard thirty percent region of the wing span. The loss of inboard lift is progressive. It increases as the angle of attack increases during the maneuver.

The loss of lift reduces downwash at the tail, making the horizontal stabilizers at the tail operate more effectively to generate a moment in opposition to pitchup.

Observations support the premise that it is not a vane tip vortex, but rather a shed wake behind the vanes 26, 28 that interacts with the upper wing surfaces to induce an earlier inboard wing separation. Observations and test results also support the premise that the vane wakes interact with the inboard wing boundary layers, which have been weakened by wing shock, in a manner to initiate the early separation.

Tests indicate that the effectiveness of the pitch control vanes 26, 28 is sensitive to small geometry changes and location. The low sweep taper plan form that is illustrated was found to be quite effective.

Figure 8:
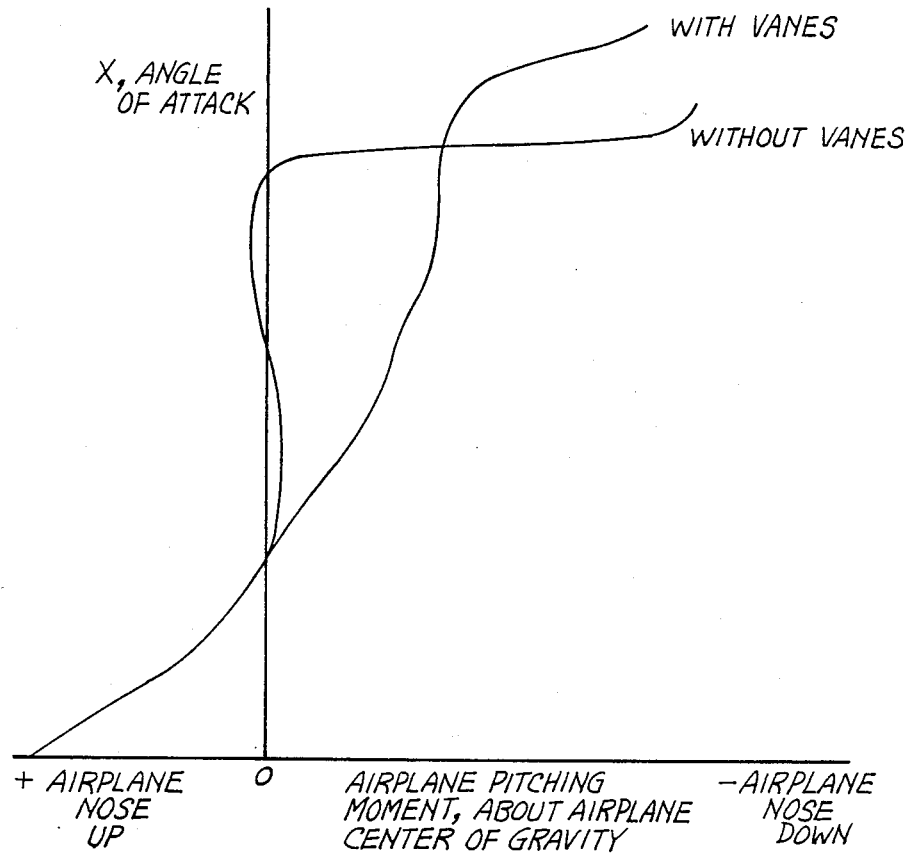
FIG. 8 is a graph of angle of attack verses pitching moment, showing the effect that the pitch control vanes of the present invention have on the pitching moment.

FIG. 8 is a plot of airplane pitching moment as a function of airplane angle of attack. Consider "A" to be the level flight angle of attack of the airplane. Pitching moment of the airplane must equal zero as a requisite for equilibrium. If the airplane is disturbed in angle of attack from "A" and is not equipped with vanes, the airplane will display the pitching moment characteristics of the red line, which possesses the traits of pitchup. This is undesirable in that the pitching moment change with angle of attack required to restore the airplane to "A" is substantially lower than that for an airplane with vanes.

What is claimed is:

1. An aircraft comprising a fuselage, a pair of swept-back wings attached to the fuselage, each having a swept-back leading edge and upper and lower surfaces; a tail section including a pair of horizontal stabilizers connected to the fuselage rearwardly of the wings; and the improvement comprising apparatus for modulating the stall characteristics of the inboard portions of the wings, comprising:

at least one pitch control vane means on each side of the fuselage, each said vane means being attached to the fuselage forwardly of the wing on its side of the fuselage, each said vane means projecting generally laterally outwardly from the fuselage, and said vane means being positioned relative to the wings and being shaped such that in response to an increase in the angle of attack of the wings beyond a predetermined angle of attack the vane means will cooperate with the wings to raise the wing downwash field at the tail section in a manner such that the horizontal stabilizers function better to oppose pitchup of the aircraft.

2. An aircraft according to claim 1, wherein each said vane means is substantially aligned with streamlines during level flight, so that during level flight said vane means produces essentially no lift and minimal drag, but upon an increase in the angle of attack of the wings beyond said predetermined angle of attack the vane means will have an angle of attack, and the configuration of the vane means being such that when at such angle of attack the vane means will generate vortices which flow rearwardly over the upper surfaces of the wings generally adjacent where the wings are attached to the fuselage.

3. An aircraft according to claim 2, wherein fairing regions exist between the upper surfaces of the wings and the fuselage and each vane means has a span length which is larger than the width of the fairing region.

4. An aircraft according to claim 1, wherein each vane means has a swept-back leading edge and an airfoil cross-sectional configuration.

5. An aircraft according to claim 1, wherein each vane means has a swept-back leading edge, a forwardly angled trailing edge, an airfoil cross section and it tapers in thickness as it extends outwardly from the fuselage.

6. An aircraft according to claim 2, wherein each vane means has a swept-back leading edge and an airfoil cross-sectional configuration.

7. An aircraft according to claim 3, wherein each vane means has a swept-back leading edge and an airfoil cross-sectional configuration.

8. An aircraft according to claim 2, wherein each vane means has a swept-back leading edge, a forwardly angled trailing edge, an airfoil cross section and it tapers in thickness as it extends outwardly from the fuselage.

9. An aircraft according to claim 3, wherein each vane means has a swept-back leading edge, a forwardly angled trailing edge, an airfoil cross section and it tapers in thickness as it extends outwardly from the fuselage.

10. An aircraft comprising a fuselage, a pair of wings attached to the fuselage on opposite sides thereof, said wings extending laterally outwardly from the fuselage, and said wings being of a type which tend to stall in their outer regions prior to in their inner regions; a tail section including a pair of horizontal stabilizers connected to the fuselage rearwardly of the wings; and the improvement comprising apparatus for modulating the stall characteristics of the inner portions of the wings, comprising:

at least one pitch control vane means on each side of the fuselage, each said vane means being attached to the fuselage forwardly of the wing on its side of the fuselage, each said vane means projecting generally laterally outwardly from the fuselage, and said vane means being positioned relative to the wings and being shaped such that during one "g" flight (i.e. lift equals weight of aircraft) of the aircraft the vane means are substantially aligned with streamlines and produce essentially no lift and minimal drag, but in response to an increase in the angle of attack of the wings beyond a predetermined angle of attack the vane means will cooperate with the wings to raise the wing downwash field at the tail in a manner such that the horizontal stabilizers function better to oppose pitchup of the aircraft.

11. An aircraft according to claim 10, with said vane means being positioned relative to the wings and being shaped such that in response to an increase in the angle of attack of the wings beyond a predetermined angle of attack, the vane means will modify the aerodynamic characteristics of the inner portions of the wings, causing an earlier stall of the inner portions of the wings.

12. An aircraft according to claim 11, wherein fairing regions exist between the upper surfaces of the wings and the fuselage and each vane means has a span length which is larger than the width of the fairing region.

13. An aircraft according to claim 11, wherein each vane means has a swept-back leading edge and an airfoil cross-sectional configuration.

14. An aircraft according to claim 11, wherein each vane means has a swept-back leading edge, a forwardly angled trailing edge, an airfoil cross section and it tapers in thickness as it extends outwardly from the fuselage.

15. An aircraft according to claim 12, wherein each vane means has a swept-back leading edge and an airfoil cross-sectional configuration.

16. An aircraft according to claim 12, wherein each vane means has a swept-back leading edge, a forwardly angled trailing edge, an airfoil cross section and it tapers in thickness as it extends outwardly from the fuselage.

17. A method of opposing the tendency of an aircraft having swept-back wings to stall during certain maneuvers comprising using vanes attached to the aircraft body forwardly of the wings to produce a flow of vortices over the inboard portions of the wings during such maneuvers of a type which will cause the inboard portion of the wings to stall earlier resulting in the raising of the wing downwash field in a manner such that the horizontal stabilizers of the tail will function better to oppose pitchup of the aircraft.

* * * * *

UNITED STATES PATENT AND TRADEMARK OFFICE
CERTIFICATE OF CORRECTION

PATENT NO. : 4,569,494
DATED : February 11, 1986
INVENTOR(S) : Sumio T. Sakata

It is certified that error appears in the above-identified patent and that said Letters Patent are hereby corrected as shown below:

Column 2, line 33, "smalller" should be -- smaller --.
Column 2, line 62, "when" should be -- than --.
Column 2, line 68, "read" should be -- rear --.

Signed and Sealed this

Eighth Day of July 1986

[SEAL]

Attest:

DONALD J. QUIGG

Attesting Officer

Commissioner of Patents and Trademarks